(12) United States Patent
Higashikozono et al.

(10) Patent No.: US 7,928,314 B2
(45) Date of Patent: Apr. 19, 2011

(54) TERMINAL BOX FOR A SOLAR BATTERY MODULE AND A METHOD FOR PRODUCING SUCH A TERMINAL BOX

(76) Inventors: Makoto Higashikozono, Yokkaichi (JP); Kazuki Naito, Yokkaichi (JP); Hiroyuki Yoshikawa, Yokkaichi (JP)

( * ) Notice: Subject to any disclaimer, the term of this patent is extended or adjusted under 35 U.S.C. 154(b) by 1056 days.

(21) Appl. No.: 11/114,498

(22) Filed: Apr. 25, 2005

(65) Prior Publication Data

US 2005/0236031 A1      Oct. 27, 2005

(30) Foreign Application Priority Data

Apr. 23, 2004   (JP) .................................. 2004-128432

(51) Int. Cl.
  *H01L 31/00*       (2006.01)
  *H01R 13/46*       (2006.01)
(52) U.S. Cl. ............................. 136/244; 174/50; 174/59
(58) Field of Classification Search .................. 136/244, 136/256; 323/299; 174/50, 59
  See application file for complete search history.

(56) References Cited

U.S. PATENT DOCUMENTS

| 4,577,051 A | 3/1986 | Hartman |
| 5,290,366 A | 3/1994 | Riermeier et al. |
| 6,344,612 B1 | 2/2002 | Kuwahara et al. |
| 2002/0117200 A1* | 8/2002 | Yoshikawa et al. ........... 136/256 |
| 2003/0193322 A1* | 10/2003 | Higashikozono et al. .... 323/299 |

FOREIGN PATENT DOCUMENTS

| JP | 2002057360 A | * | 2/2002 |
| JP | 2002-141537 | | 5/2002 |
| JP | 2002-359389 | | 12/2002 |
| JP | 3498945 | | 12/2003 |

OTHER PUBLICATIONS

Online translation of JP2002057360A, published Feb. 22, 2002.*

* cited by examiner

*Primary Examiner* — Jeffrey T Barton
(74) *Attorney, Agent, or Firm* — Gerald E. Hespos; Michael J. Porco

(57) ABSTRACT

A terminal box for a solar battery module is provided with a plurality of terminal plates (30) juxtaposed in a box main body (10) and connectable with positive and negative electrodes of the solar battery module, cables (90) for external connection connectable with the terminal plates (30), a conductor piece (50) connected with one of two corresponding terminal plates (30) and extending from this one terminal plate toward the other, and a bear chip diode (70) held between the conductor piece (50) and the other terminal plate (30) to be connected with both. The conductor piece (50) is connectable with a P-area (72) of the bear chip diode (70) and the other terminal plate (30) is connectable with an N-area (71) of the bear chip diode (70).

10 Claims, 4 Drawing Sheets

TERMINAL BOX FOR A SOLAR BATTERY MODULE AND A METHOD FOR PRODUCING SUCH A TERMINAL BOX

BACKGROUND OF THE INVENTION

1. Field of the Invention

The invention relates to a terminal box for a solar battery module and a method for producing such a terminal box.

2. Description of the Related Art

A solar energy generation system supplies direct-current electricity from a solar battery panel on the roof of a building to electric equipment via an inverter or the like. The solar battery panel has solar battery modules, and electrodes of the solar battery modules are connected in series or in parallel via terminal boxes.

Japanese Patent Publication No. 3498945 discloses a known terminal box that has terminal plates juxtaposed in a box. Ends of the terminal plates at one side are connectable with positive and negative electrodes drawn out from the underside of the solar battery module. The other ends of the terminal plates are connectable with cables for external connection. Bypass diodes span between adjacent terminal plates. The bypass diode shorts an inverse current at the time of an inverse load from one cable for external connection to the other. The bypass diode has a chip-shaped diode functioning portion and two conductor pieces connected with the diode functioning portion while holding the diode functioning portion therebetween. The conductor pieces have contacts and the diode functioning portion is between overlapping portions of the contacts. The conductor pieces extend in opposite directions from the contacts, and have extending ends connected to the corresponding terminal plates. The contacts of the conductor pieces are supported from below by the bottom surface of the box or distanced therefrom between the adjacent terminal plates.

Heat generated by the diode functioning portion should be discharged toward the terminal plates via the respective conductor pieces. However, heat remains in the above-described diode functioning portion and the bypassing function of the diode functioning portion can be impaired.

The invention was developed in view of the above problem and an object thereof is to improve heat discharging characteristics.

SUMMARY OF THE INVENTION

The invention relates to a terminal box for a solar battery module. The terminal box has a box main body, and terminal plates are arranged in the box main body. The terminal plates are connectable with positive and negative electrodes of the solar battery module and are connectable with cables for external connection. A conductor piece extends from one terminal plate toward another, and a rectifying-device main body is held between the conductor piece and the other terminal plate and is connected directly with both.

The rectifying-device main body is held directly between the conductor piece and the terminal plate. Thus, heat generated by the rectifying-device main body can be discharged directly and quickly towards the terminal plates. Heat discharging characteristics are better as compared to a case where the rectifying-device main body is held between the conductor pieces.

The rectifying-device main body preferably is provided for bypass at the time of an inverse load.

The terminal plates preferably are juxtaposed in the box main body.

The rectifying-device main body preferably includes a bear chip diode, a mesa chip diode or surface etched diode. The conductor piece is connectable with a P-area of the bear chip diode and the other terminal plate is connectable with an N-area of the bear chip diode. Thus, a large joined area is ensured between the terminal plate and the bear chip diode, and the heat generated by the bear chip diode can be discharged efficiently from the N-area to the terminal plate.

The conductor piece preferably has a terminal-side contact connected with one of the adjacent terminal plates and a device-side contact extending from the terminal-side contact towards the other terminal plate.

The device-side contact preferably is placed on the other terminal plate while holding the bear chip diode between it and the other terminal plate.

The conductor piece preferably has a stress relieving portion between the device-side contact and the terminal-side contact to absorb a stress acting thereon and/or on adjacent elements.

Adjacent terminal plates excluding those to be connected with the cables preferably are coupled temporarily to each other via a coupling portion at one end. At least one of these terminal plates preferably has no contact with the lead of the solar battery module, is shorter than the other terminal plate and/or has the leading end thereof at least partly surrounded by partition walls.

The invention also relates to a method for producing a terminal box for a solar battery module. The method comprises applying solder paste onto parts of at least two terminal plates. The method then places a rectifying device main body, preferably a bear chip diode, and a conductor piece on the corresponding terminal plates so that the rectifying device main body is between the one terminal plate and the conductor piece. The method then proceeds by heating and melting the solder paste. The molten solder paste then is solidified to solder-weld the rectifying device main body and the conductor piece to the corresponding terminal plates.

The method for producing the terminal box for a solar battery module may include coupling two terminal plates by a bridging portion. The method then includes applying solder paste onto the terminal plates. The method proceeds by placing a rectifying device main body and a conductor piece on the solder paste of the corresponding terminal plates so that the rectifying device main body is between the one terminal plate and the conductor piece. The method continues by heating the solder paste to melt the solder paste and solidifying the molten solder paste, thereby solder-welding the rectifying device main body and the conductor piece to the corresponding terminal plates. The method then includes interrupting the bridging portion after the terminal plates are assembled into the box main body.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
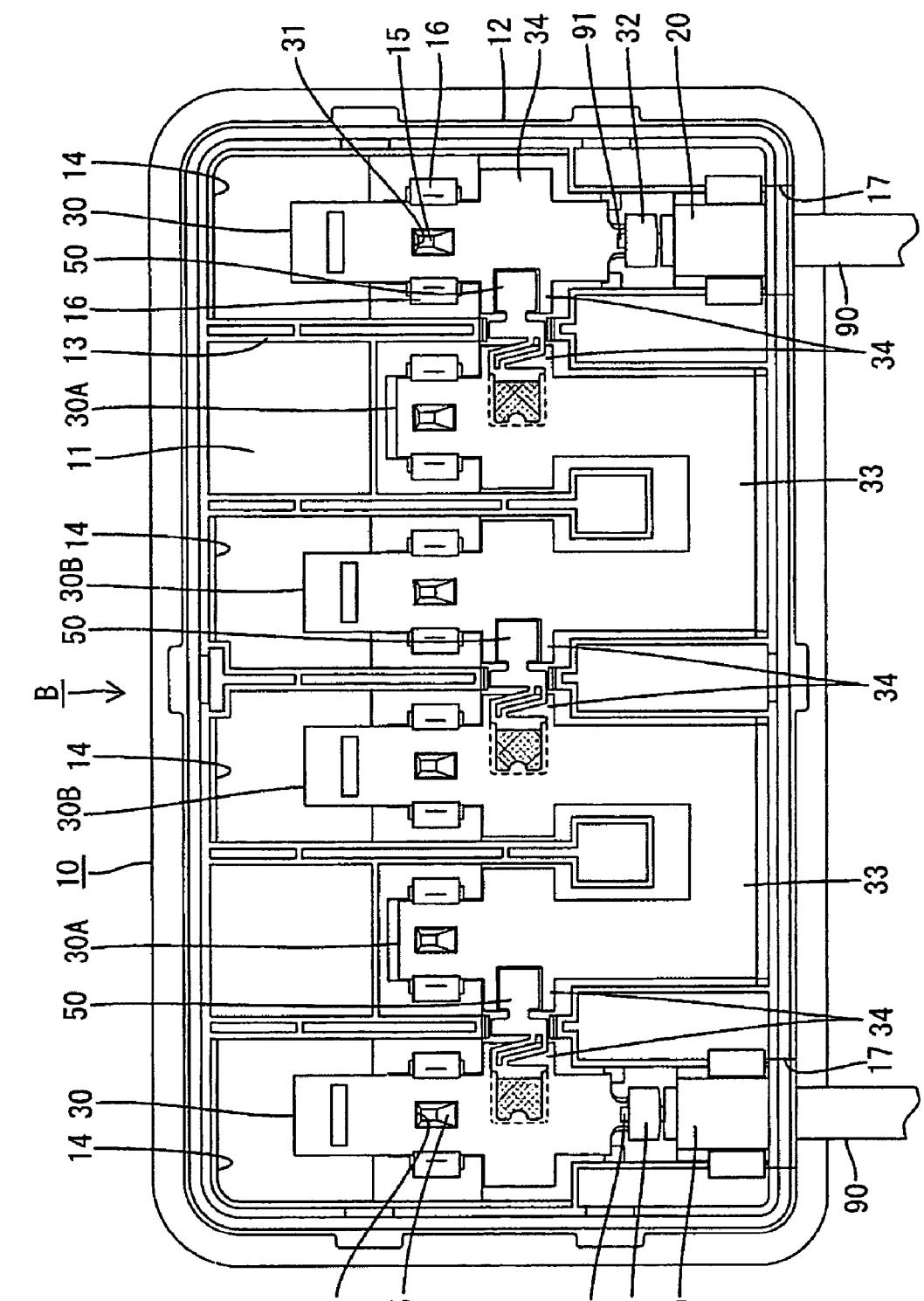
FIG. 1 is a plan view of a box main body according to one embodiment of the invention.

A terminal box for a solar battery module according to the invention is identified by the letter B in FIGS. 1 to 4. The terminal box B is mounted on the underside of a solar battery module (not shown) having solar battery cells connected in series arranged on the outer surface thereof.

The terminal box B has a box main body 10 made e.g. of a synthetic resin and defines a box with an open top. The term top is used herein to provide a convenient frame of reference, but does not imply a required gravitational orientation. The box main body 10 has a substantially rectangular base plate 11 and a side plate 12 projects up from the outer peripheral edge of the base plate 11 to surround at least part of the base plate 11. Insulating resin is filled into the inside of the box main body 10, and a cover (not shown) is mountable on the box main body 10 from above. Terminal plates 30 are arranged substantially side by side on the base plate 11 and partition walls 13 stand up at specified positions of the base plate 11 to partition the adjacent terminal plates 30. The base plate 11 has four substantially rectangular openings 14, and the leading ends of the corresponding terminal plates 30 face the respective openings 14. Leads (not shown) connected with positive and negative electrodes of the solar battery module are introduced through the respective openings 14 of the base plate 11 and are connectable with the leading ends of the terminal plates 30, e.g. by soldering, (ultrasonic) welding, press-fitting, clamping or the like.

Positioning projections 15 project from the upper surface of the base plate 11 and are engageable with positioning holes 31 of the terminal plates 30. Two resiliently deformable locking pieces 16 project at opposite outer sides of each positioning projection 15. The locking pieces 16 deform laterally in the process of mounting the terminal plate 30 to widen the spacing therebetween. The locking pieces 16 restore as the terminal plate 30 is mounted properly to press the opposite lateral edges of the terminal plate 30 from above, thereby preventing the terminal plate 30 from moving up and away from the base plate 11.

Notches 17 are formed at the substantially opposite ends of the upper edge of the side plate 12. Cables 90 for external connection are fit into the notches 17 from above and cable pressing members 20 fix the cables 90 into the notches 17. The fitted cable pressing members 20 are unitarily continuous with the side plate 12. The partition walls 13 extend substantially along the outer shapes of the terminal plates 30, and the terminal plates 30 are mounted and guided by the partition walls 13. Further, insulating resin is fill into inner spaces defined by the partition walls 13 above the terminal plates 30.

The terminal plates 30 are formed by cutting or stamping an electrically conductive metal plate into strips. The terminal plates 30 at opposite ends of the base plate 11 are connected with the corresponding cables 90 for external connection. An insulation coating is stripped at an end of each cable 90 to expose a core 91, and a barrel 32 at an end of the terminal plate 30 is crimped, bent or folded into connection to connect the cable 90 and the terminal plate 30. An extending end of the cable 90 is connected with a connector portion (not shown).

The terminal plates 30 that are not connected with the cables 90 are arranged in pairs 30A, 30B. The terminal plates 30A, 30B in each such pair are coupled unitarily to each other via a coupling 33 at one end. The terminal plate 30A is shorter than the terminal plate 30B. Additionally, the terminal plate 30A does not contact the lead of the solar battery module and at least part of the leading end of the terminal plate 30A is surrounded by the partition walls 13. Thus, the terminal plate 30A detours from the other terminal plate 30 without being directly involved in connection with the mating side, and a creepage distance for letting heat generated by the bear chip diode 70 escape is lengthened by this detour to improve a heat discharging effect.

Attachments 34 bulge out sideways at opposite lateral edges of each terminal plate 30 and edges of the attachments 34 at the projecting ends are opposed to each other between the adjacent terminal plates 30. The conductor pieces 50 thinner than the terminal plates 30 span between the adjacent terminal plates 30. In the shown case, three conductor pieces 50 are arranged in series while crossing the respective terminal plates 30.

Figure 2:
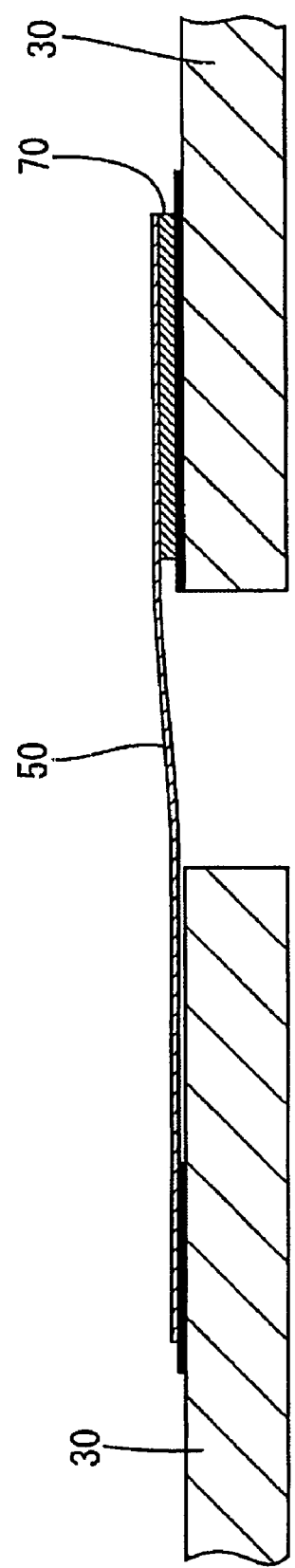
FIG. 2 is a diagrammatic section showing a bear chip diode and a conductor piece connected with terminal plates.
Figure 3:
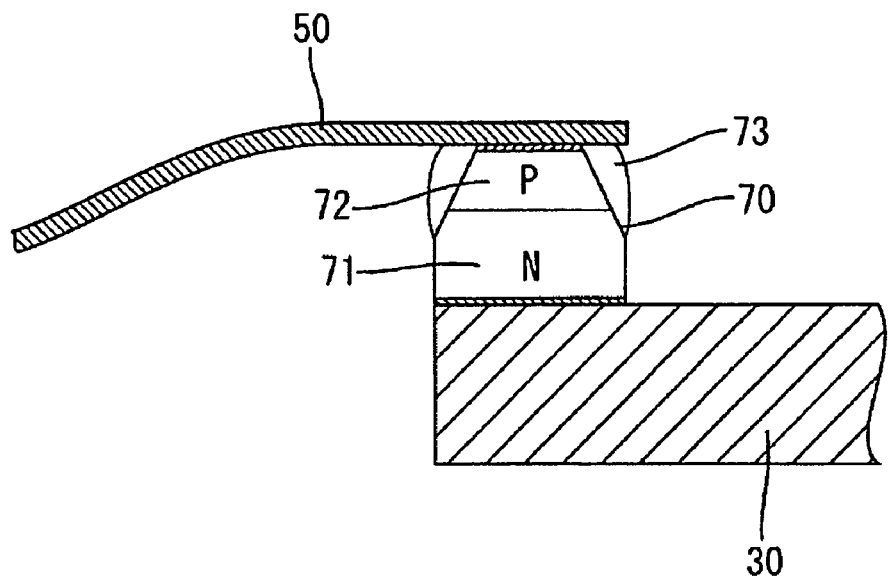
FIG. 3 is a diagrammatic section showing a structure of the bear chip diode.
Figure 4:
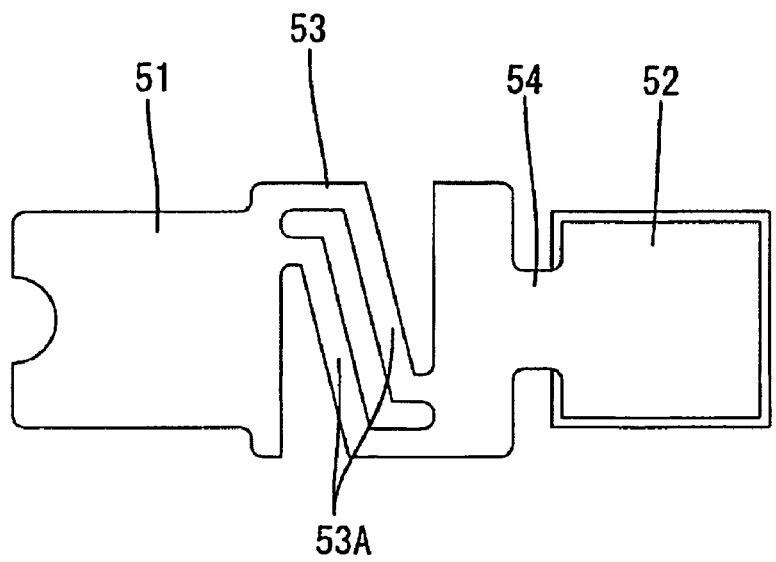
FIG. 4 is a plan view of the conductor piece.

As shown in FIGS. 2 to 4, each conductor piece 50 has a terminal-side contact 51 connected with one of the adjacent terminal plates 30, e.g. by solder welding, soldering, ultrasonic welding, gluing with a conductive glue or the like. A device-side contact 52 extends from the terminal-side contact portion 51 towards the other terminal plate 30 and is placeable on the other terminal plate 30 while holding the bear chip diode 70 between the adjacent terminal plates 30. A stress relieving portion 53 is arranged between the device-side contact 52 and the terminal-side contact 51 to absorb stress resulting from welding or the like.

As shown in FIG. 3, the bear chip diode 70 has a multilayer structure that includes an anode electrode, i.e. a P-area 72, placed over a cathode electrode, i.e. an N-area 71, to form a substantially trapezoidal or troncoconical shape and a glass film 73 is provided around this multilayer structure. The device-side contact 52 of the conductor piece 50 is connectable with the P-area 72 of the bear chip diode 70 and the terminal plate 30 is connectable with the N-area 71 of the bear chip diode 70.

The terminal-side contact 51 is superimposed on the one terminal plate 30 along its plane direction (i.e. a direction substantially normal to the plane), and is welded to this superimposed portion. The stress relieving portion 53 includes narrow strip pieces 53A extending substantially oblique to the longitudinal direction of the conductor piece 50. Thus, the conductor piece 50 can expand and contract along the longitudinal direction of the conductor piece 50 by the deformation of the narrow strip pieces 53A. The narrow strip pieces 53A are spaced apart by a specified distance and have substantially the same width over substantially their entire lengths. The device-side contact 52 is substantially continuous with the stress relieving portion 53 via a rectangular constriction 54, and has the lower surface connected with the P-area 72 of the bear chip diode 70 by soldering or welding. The attachment portion 34 of the other terminal plate 30 faces this device-side contact 52 with the bear chip diode 70 sandwiched therebetween. The bear chip diode 70 is placed thereon and connected by soldering or welding.

Either of two methods can be adopted to connect the bear chip diodes 70 and the conductor pieces 50 with the terminal plates 30. A first method mounts the terminal plates 30 on the base plate 11 and solder paste is applied in specified areas on the terminal plates 30. The bear chip diodes 70 and the conductor pieces 50 then are placed on the solder paste on the corresponding terminal plates 30 and solder-welded is applied to the corresponding terminal plates 30 by heating the solder paste with a soldering iron or by resistance welding to melt the solder paste and then solidifying the molten solder paste.

Figure 5:
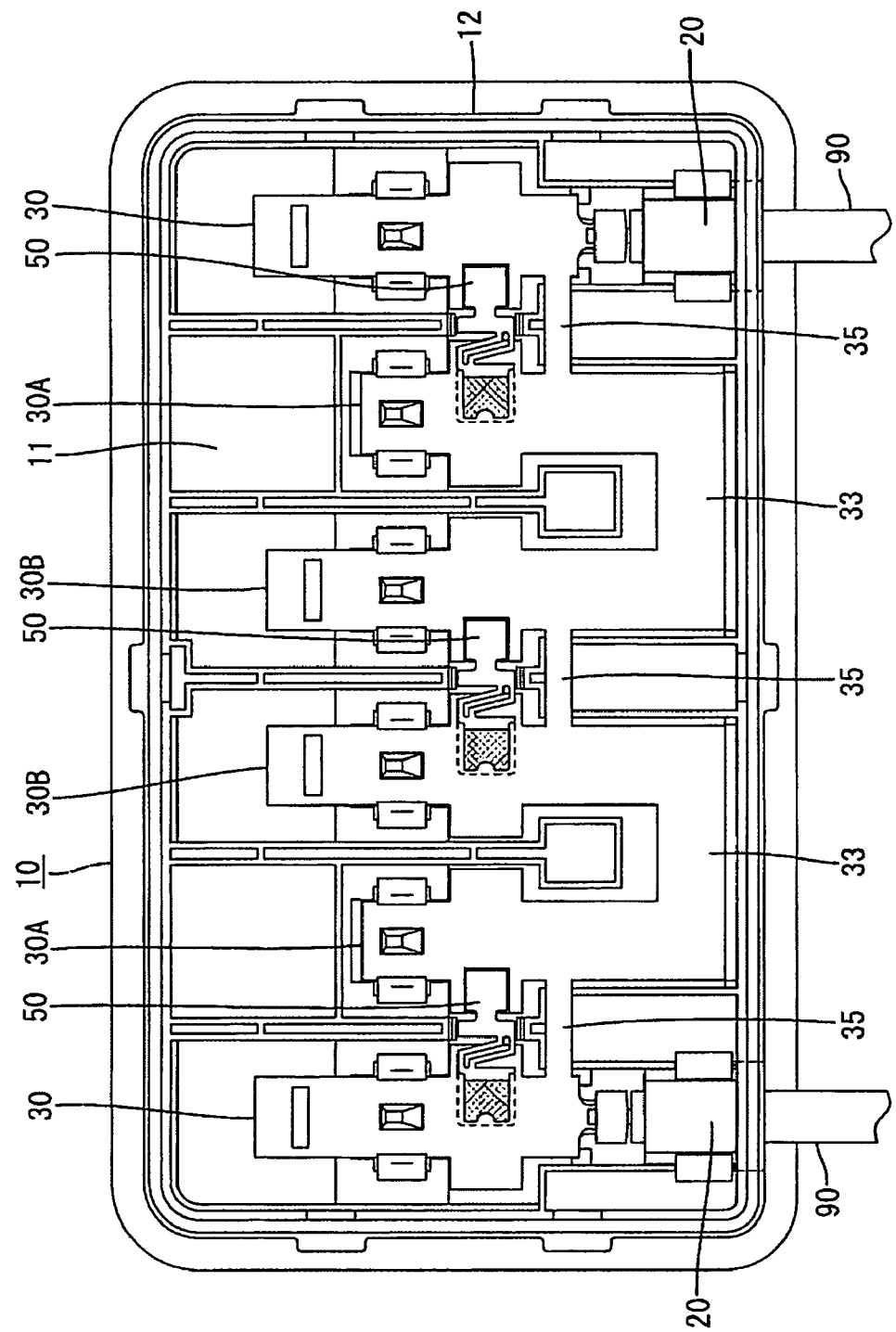
FIG. 5 is a plan view of the box main body before bridging portions are cut off.

A second method integrally or unitarily couples the adjacent terminal plates 30 to each other by bridging portions 35 as shown in FIG. 5 prior to the mounting of the terminal plates 30 on the base plate 11. These chained terminal plates 30 are positioned and set in a carbon jig and solder paste is applied in specified areas on the terminal plates 30. The bear chip diodes 70 and the conductor pieces 50 then are placed on the solder paste of the corresponding terminal plates 30 and are solder-welded to the corresponding terminal plates 30 by heating the solder paste in a reflow apparatus to melt the solder paste and then solidifying the molten solder paste. According to this second method, the bridging portions 35 are separated or cut off after the terminal plates 30 are mounted on the base plate 11.

The terminal plates 30 are positioned on the base plate 11 by inserting the positioning projections 15 projecting from the base plate 11 into the positioning holes 31 of the terminal plates 30. Resilient locking pieces 16 engage the terminal plates 30 to prevent the terminal plates 30 from moving up and away from the base plate 11. The barrels 32 of the terminal plates 30 are crimped, bent or folded into connection with the cores 91 exposed at the ends of the cables 90 to connect the terminal plates 30 and the cables 90. The cable pressing members 20 are mounted to cover the cables 90 from above or from outside. Thus, the cables 90 are fixed and loose movements are prevented.

The box main body 10 is mounted to the underside of the solar battery module preferably using an adhesive double coated tape or is secured thereto by bolts. Leads connected with the electrodes of the solar battery module are drawn through the respective openings 14 of the base plate 11 and into the box main body 10 during the mounting process and are connected with the leading ends of the terminal plates 30 by soldering, welding, press-fitting or the like. Insulating resin, such as a silicone, then is filled into the inner spaces between the partition walls 13 in the box main body 10, and the cover is mounted to close the box main body 10. The crimp-connected parts, the solder-connected parts, and similarly connected parts are sealed airtight by the insulating resin.

As described above, the heat generated by the bear chip diodes 70 can be discharged directly and quickly towards the terminal plates 30 because the bear chip diodes 70 are held between the conductor pieces 50 and the terminal plates 30 either in direct surface contact or in contact via a thin connection made e.g. by soldering paste or other connecting element. Thus, heat-discharging characteristics are better as compared to a case where the bear chip diodes are held between the conductor pieces 50. Accordingly, the bypassing function of the bypass diode constructed by the bear chip diode 70 and the conductor piece 50 can be displayed over a long time.

The conductor piece 50 connects the P-area 72 of the bear chip diode 70 and the terminal plate 30 is connectable with the N-area 71 of the bear chip diode 70. Thus, a large joined area is ensured between the terminal plate 30 and the bear chip diode 70 and heat generated by the bear chip diode 70 is discharged efficiently to the terminal plate 30 from the N-area 71.

The invention is not limited to the above described and illustrated embodiment. For example, the following embodiments are embraced by the scope of the invention as defined by the claims. Other changes can be made without departing from the scope of the invention as defined by the claims.

Although several terminal plates are juxtaposed in the box main body in the foregoing embodiment, only two terminal plates may be arranged in the box main body according to the invention.

Although the conductor pieces and the terminal plates are connected by solder welding in the foregoing embodiment, they may be connected by resistance welding or ultrasonic welding or by any other connecting methods according to the present invention.

What is claimed is:

1. A terminal box for a solar battery module, comprising:
   a box main body;
   first and second terminal plates arranged in the box main body, the first terminal plate being connectable with one of positive and negative electrodes of the solar battery module and connectable with one of respective cables for external connection, the second terminal plate being connectable with one of positive and negative electrodes of the solar battery module, each of the first and second terminal plates being formed as a single, unitary strip;
   a third terminal plate unitarily formed with the second terminal plate via a coupling portion, the third terminal plate not being connected with the solar battery module and being shorter than and parallel to the first and second terminal plates, the third terminal plate having a leading end thereof surrounded by partition walls;
   at least a first unitary conductor piece formed separately from the terminal plates, the first unitary conductor piece having a terminal-side contact connected with the first terminal plate and a device-side contact extending towards the third terminal plate; and
   a rectifying-device main body being held between the device-side contact of the first conductor piece and the third terminal plate, the rectifying-device main body being directly connected with the device-side contact of the first unitary conductor piece and the third terminal plate.

2. The terminal box of claim 1, wherein the rectifying-device main body is provided for bypass at the time of an inverse load.

3. The terminal box of claim 1, wherein the terminal plates are juxtaposed in the box main body.

4. The terminal box of claim 1, wherein the rectifying-device main body includes a bear chip diode, the device-side contact of the conductor piece being connectable with a P-area of the bear chip diode and the third terminal plate being connectable with an N-area of the bear chip diode (70).

5. The terminal box of claim 1, wherein the conductor piece comprises a stress relieving portion between the device-side contact and the terminal-side contact portion and configured for absorbing stress acting on the conductor piece.

6. A terminal box for a solar battery module that has plurality of electrodes, comprising:
   a box main body;
   a first cable-connected terminal plate arranged in the box main body, the first cable-connected terminal plate having one end connectable with one of the electrodes of the solar battery module and another end connectable with a first cable for external connection;
   a second cable-connected terminal plate arranged in the box main body and having an end connectable with one of the electrodes of the solar battery module and a second end connectable with a second cable for external connection;
   an intermediate terminal plate arranged in the box main body between the first and second cable-connected terminal plates;

each of the first cable-connected, second cable-connected and intermediate terminal plate being formed as a single, unitary strip;

a first unitary conductor piece formed separately from the terminal plates, the first unitary conductor piece having a first terminal-side contact connected with the first cable-connected terminal plate and a first device-side contact extending towards the intermediate terminal plate;

a second unitary conductor piece formed separately from the terminal plates and having a second terminal-side contact connected with the intermediate terminal plate and a second device-side contact extending towards the second cable-connected terminal plate;

a first rectifying-device main body held between the first device-side contact and the intermediate terminal plate, the first rectifying-device main body being directly connected with the first device-side contact and the intermediate terminal plate; and a second rectifying-device main body held between the second device-side contact and the second cable-connected terminal plate, the second rectifying-device main body directly connected with the second device-side contact and the second cable-connected terminal plate, wherein the intermediate terminal plate is substantially U-shaped with parallel first and second legs unitarily formed with a coupling portion, with one of the legs of the intermediate terminal plate being connected to an electrode of the solar battery module, and the other leg being connected to the respective rectifying-device main body.

7. The terminal box of claim 6, wherein each of the conductor pieces has a stress relieving portion between the device-side contact thereof and the terminal side contact thereof, the stress relieving portion being configured for absorbing stress acting on the respective conductor piece.

8. A terminal box for a solar battery module has a plurality of electrodes, comprising:

a box main body;

a first cable-connected terminal plate arranged in the box main body, the first cable-connected terminal plate having one end connectable with one of the electrodes of the solar battery module and another end connectable with a first cable for external connection;

a second cable-connected terminal plate arranged in the box main body and having an end connectable with one of the electrodes of the solar battery module and a second end connectable with a second cable for external connection;

a first intermediate terminal plate arranged in the box main body between the first and second cable-connected terminal plates, the first intermediate terminal plate having an end connectable with one of the electrodes of the solar battery module;

a second intermediate terminal plate arranged in the box main body between the first intermediate terminal plate and the second cable-connected terminal plate, the second intermediate terminal plate being connectable with one of the electrodes of the solar battery module;

each of the first cable-connected, second cable-connected, first intermediate and second intermediate terminal plate being formed as a single, unitary strip;

a first unitary conductor piece formed separately from the terminal plates and having a terminal-side contact connected with the first cable-connected terminal plate and a device-side contact extending towards the first intermediate terminal plate;

a second unitary conductor piece formed separately from the terminal plates, the second unitary conductor piece having a terminal side contact connected with the first intermediate terminal plate and a device-side contact extending towards the second intermediate terminal plate;

a third unitary conductor piece formed separately from the terminal plates, the third unitary conductor piece having a terminal-side contact connected with the second intermediate terminal plate and a device-side contact extending towards the second cable-connected terminal plate;

a first rectifying-device main body held between the device-side contact of the first unitary conductor piece and the first intermediate terminal plate, the first rectifying-device main body directly connected with the device-side contact of the first unitary conductor piece and the first intermediate terminal plate;

a second rectifying-device main body held between the device-side contact of the second unitary conductor piece and the second intermediate terminal plate, the second rectifying-device main body directly connected with the device-side contact of the second unitary conductor piece and the second intermediate terminal plate; and a third rectifying-device main body held between the device-side contact of the third unitary conductor piece and the second cable-connected terminal plate, the third rectifying-device main body connected with the device-side contact of the third unitary conductor piece and the second cable-connected terminal plate, wherein each of the intermediate terminal plates is substantially U-shaped with parallel first and second legs unitarily formed with a coupling portion, with one of the legs of each of the intermediate terminal plates being connected to an electrode of the solar battery module, and the other leg being connected to the respective rectifying-device main body.

9. The terminal box of claim 8, wherein each of the conductor pieces has a stress relieving portion extending unitarily between the device-side contact thereof and the terminal side contact thereof, the stress relieving portion being configured for absorbing stress acting on the respective conductor piece.

10. The terminal box of claim 1, wherein the at least first and second terminal plates have a first width and the first unitary conductor piece has a substantially uniform second width along a length thereof, the first width being larger than the second width.

* * * * *